(12) United States Patent
Lissel et al.

(10) Patent No.: US 6,851,350 B2
(45) Date of Patent: Feb. 8, 2005

(54) VALVE DEVICE FOR A CONTROL CYLINDER

(75) Inventors: Norbert Lissel, Barsinghausen (DE); Andreas Teichmann, Isernhagen HB (DE)

(73) Assignee: Wabco GmbH & Co. OHG, Hannover (DE)

( * ) Notice: Subject to any disclaimer, the term of this patent is extended or adjusted under 35 U.S.C. 154(b) by 69 days.

(21) Appl. No.: 10/382,783

(22) Filed: Mar. 6, 2003

(65) Prior Publication Data

US 2003/0172805 A1 Sep. 18, 2003

(30) Foreign Application Priority Data

Mar. 12, 2002 (DE) .......................... 102 10 877

(51) Int. Cl.[7] .............................................. F16K 31/06
(52) U.S. Cl. ............................ 91/426; 91/442; 91/449
(58) Field of Search ......................... 91/442, 426, 449, 91/433, 32, 454; 192/12 C, 85 R

(56) References Cited

U.S. PATENT DOCUMENTS

| | | | | | |
|---|---|---|---|---|---|
| 4,741,247 A | * | 5/1988 | Glomeau et al. | ............. | 91/459 |
| 4,830,046 A | * | 5/1989 | Holt | ........................... | 137/517 |
| 5,035,312 A | * | 7/1991 | Asayama et al. | ......... | 192/85 R |
| 5,209,153 A | * | 5/1993 | Araki et al. | ................... | 91/454 |
| 5,313,873 A | * | 5/1994 | Gall et al. | ..................... | 91/454 |
| 5,315,873 A | * | 5/1994 | Jin | .............................. | 73/309 |
| 5,613,518 A | * | 3/1997 | Rakieski | .................. | 137/513.5 |
| 6,244,410 B1 | * | 6/2001 | Bauer | ....................... | 192/85 R |

FOREIGN PATENT DOCUMENTS

| | | |
|---|---|---|
| CH | 415 306 A | 6/1966 |
| EP | 0 512 690 A1 | 11/1992 |

* cited by examiner

Primary Examiner—Thomas E. Lazo
(74) Attorney, Agent, or Firm—Kramer Levin Naftalis & Frankel LLP

(57) ABSTRACT

For a valve arrangement of a pneumatically actuated, spring-loaded control cylinder, a non-return valve in pneumatic communication with the control cylinder piston chamber. At very low backpressures in the control cylinder piston chamber caused by leaks of the valve responsible for pressurization of the piston chamber, the chamber is vented by passage of a very small air stream via the non-return valve. In this way, leaks cannot cause a very slow pressure buildup in the control cylinder piston chamber, followed at some time by undesired shifting of the control cylinder. In contrast, in the case of normal pressure buildup, i.e., during switching of the pressurizing valve, the non-return valve is promptly closed and the pressure in the control cylinder piston chamber is not influenced.

17 Claims, 5 Drawing Sheets

VALVE DEVICE FOR A CONTROL CYLINDER

BACKGROUND OF THE INVENTION

The present invention is directed generally to a valve device for a control cylinder, which is preferably of the type used for electronically controlled pneumatic actuation of the clutch of a motor vehicle.

In conventional single-acting pneumatic control cylinders in which the pneumatic piston is shifted into its initial position (zero position of the piston rod fixed to the piston) via a return spring, a specified actuation position is established by virtue of the pneumatic pressure prevailing in the piston chamber of the control cylinder. This means that the piston rod of the control cylinder is extended by a specified travel distance compared with its zero position. The air pressure in the control cylinder piston chamber determines the position of the control cylinder piston rod; the air pressure is lowered for retraction of the piston rod toward its zero position and raised for extension toward its maximum position allowed by the cylinder length.

The air pressure in the control cylinder piston chamber is varied by means of valves. In the simplest case, a switching pressurizing valve raises the air pressure and a switching venting valve lowers the air pressure.

For application of the control cylinder as an electronically controlled, pneumatically actuated clutch control cylinder as mentioned above, the pressurizing and venting valves are designed as electrically switched valves; the air pressure in the control cylinder piston chamber being varied as desired by the switching of these valves. For precision adjustment of a specified pressure or for establishing a specified pressure gradient, such as in the clutch-engagement process, the valves are actuated in a pulsed mode.

The control cylinder is connected to the motor vehicle clutch (which can be a push-type or pull-type clutch) in such a way that the motor vehicle clutch is completely disengaged in the piston rod zero position corresponding to a piston chamber pressure of zero. During an increase in the piston chamber pressure, the piston rod becomes extended, engagement begins at a specified piston rod position (clutch engagement point) and, beginning with a further specified position, the clutch is then completely engaged.

In the zero position of the control cylinder piston rod, in which, as explained, the piston chamber of the cylinder is depressurized and, also, the two valves are in unactuated position, it is possible that small leaks in the pressurizing valve in communication with the supply pressure can cause a gradual pressure buildup in the control cylinder piston chamber. This pressure buildup could be accompanied by undesired extension of the control cylinder piston rod from zero position, which could potentially lead to undesired engagement of the motor vehicle clutch, with the result that the vehicle might experience undesired movement under certain circumstances.

Undesired pressure buildup can be prevented by occasional actuation of the venting valve. For this purpose, however, the control electronics would require additional programming which may not be consistent with the program that controls the desired switching processes of the valve. Furthermore, additional functions may be required, for example, pressure sensing, that may not be needed for other purposes. Moreover, the system would then have to be continuously energized (current consumption, battery discharge). Such a solution is therefore not particularly advantageous.

SUMMARY OF THE INVENTION

Generally speaking, in accordance with the present invention, a valve device is provided which avoids the foregoing disadvantages associated with prior art devices and arrangements.

A valve device for pressurizing or venting the piston chamber of a control cylinder (such as is used, for example, to actuate the clutch of a motor vehicle) according to a preferred embodiment of the present invention includes at least one solenoid-actuated multi-way pressurizing valve and at least one solenoid-actuated multi-way venting valve. Preferably, the pressurizing and venting valves include at least 2/2 ways. The pressurizing valve has a port in communication with a supply pressure and another port in communication with the control cylinder piston chamber; the venting valve has a port in communication with a vent and another port in communication with the control cylinder piston chamber. Both the pressurizing valve and the venting valve are in closed position when deenergized.

The valve device further includes at least one non-return valve. The non-return valve has a pneumatic inlet in communication with the control cylinder piston chamber. The non-return valve is constructed and arranged to assume an unactuated position when the pneumatic inlet is depressurized, and an actuated position when the pneumatic inlet is pressurized. In unactuated position, the non-return valve has a defined pressure leak. The pressure leak is established as a nominal width which corresponds to a preselected proportion of the nominal width of the pressurizing valve.

The non-return valve according to the present invention can be disposed separate from or in the control cylinder. If in the control cylinder, the non-return valve can be disposed in the piston or, alternatively, in the housing (including in the end wall thereof). The non-return valve can also be disposed in the pressurizing or venting valves.

Accordingly, it is an object of the present invention to provide a valve device which is constructed and arranged such that slight leaks in the pressurizing valve do not lead to undesired extension of the control cylinder piston rod, and which does not require additional programming to accomplish such purpose.

It is also an object of the present invention to provide a valve device which can be readily integrated as a component in devices that are present in any case, whereby additional assembly and connecting-line costs can be avoided.

Still other objects and advantages of the present invention will in part be obvious and will in part be apparent from the specification.

The present invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 1b is an enlarged view of the inventive valve device depicted in FIG. 1a;

FIG. 5b is a cross-sectional view of the valve device depicted in FIG. 5a taken along lines 5b–5b in FIG. 5a.

DETAILED DESCRIPTION OF THE PREFERRED EMBODIMENTS

Figure 1A:
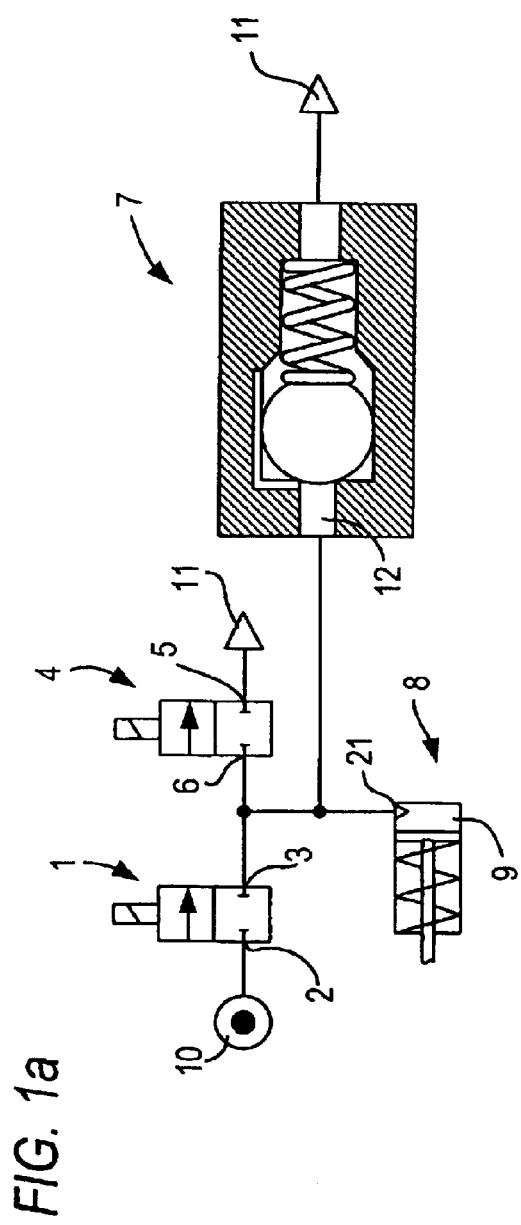
FIG. 1a is schematic diagram depicting the pneumatic valve connections for admission of compressed air to a spring-loaded control cylinder containing a valve device according to a preferred embodiment of the present invention.

Referring to the drawing figures where like reference numerals are used for corresponding parts, FIG. 1 shows a pressurizing (solenoid) valve 1 having a first port 2 in communication with a supply pressure 10 and a second port 3 in communication with a piston chamber 9 of a spring-loaded control cylinder 8. A venting (solenoid) valve 4 is also provided having a first port 5 in communication with a vent 11 and a second port 6 also in communication with control cylinder piston chamber 9.

Solenoid valves 1 and 4 are preferably provided with 2/2 ways, which represent the smallest possible number of ways for such directional multi-way control valves. It should be understood, however, that more than 2/2 ways can also be provided for these valves.

Solenoid-actuated valves 1 and 4 can be switched via an electronic control device (not shown in the drawings). In order to adjust pressure exactly in control cylinder piston chamber 9, for example, during the process of clutch engagement in the application of control cylinder 8 as a clutch control cylinder, the valves can be switched in pulsed mode.

For such an application, it may also be advantageous to provide a further pressurizing valve and a further venting valve, each with larger nominal widths, for example, for the purpose of both rapid pressurizing and rapid venting. Except for the changed nominal width, such valves can have similar designs to those of valves 1 and 4 and can be connected in parallel therewith. In such a paired arrangement, therefore, faster or slower pressure buildup or pressure reduction can be achieved as desired by appropriate valve actuation.

In the event of a leak in pressurizing valve 1 (in this regard, an explanation of how a sealing seat 28 of venting valve 4—having the same design as that of pressurizing valve 1—can be achieved via a magnet armature sealing element 30 is set forth hereinafter in connection with FIG. 4), air passes from supply 10 to control cylinder piston chamber 9. Even though the air flow is relatively small, pressure that can lead to shifting of control cylinder 8 will eventually build up in piston chamber 9.

To prevent such a pressure buildup, pneumatic communication can be provided between the control cylinder piston chamber and an inlet 12 of a non-return valve 7 constructed and arranged in accordance with the present invention.

Non-return valve 7 preferably has two switched positions. A first, unactuated position is occupied when pneumatic inlet 12 is depressurized. In this situation, as shown in FIG. 1b, a sealing ball 13 is pressed by the force of a spring 19 against a first sealing seat 17 at pneumatic inlet 12. In this position, non-return valve 7 is designed to allow a defined leak.

Preferably, non-return valve 7 is provided with a groove comprising a radial portion 36 and a longitudinal portion 16 (shown in cross section in FIG. 1c taken along line 1c—1c in FIG. 1b through the center of sealing ball 13) by which a small air opening to vent 11 is formed. Sealing ball 13 is housed in a cylindrical guide 14, and groove 16 in the cylindrical guide therefore extends as far as a bore 15 at pneumatic inlet 12.

A second or actuated position of non-return valve 7 is established when pneumatic inlet 12 is pressurized. Because pressure is present at pneumatic inlet 12, and also because the leak is relatively small, a backpressure sufficient to press sealing ball 13 sealingly against a second sealing seat 18 can build up, and so inlet 12 is pneumatically shut off from vent 11.

Figure 1C:
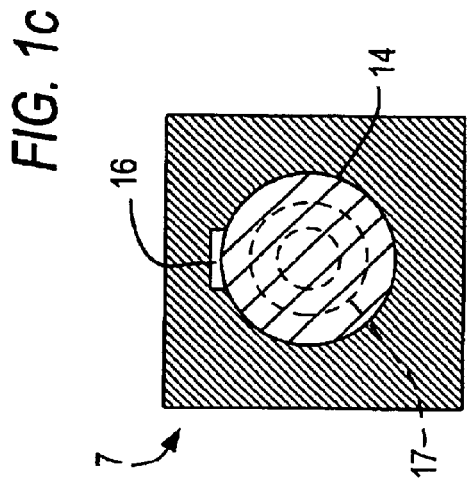
FIG. 1c is a cross-sectional view of the inventive valve device taken along lines 1c—1c in FIG. 1b.
Figure 1B:
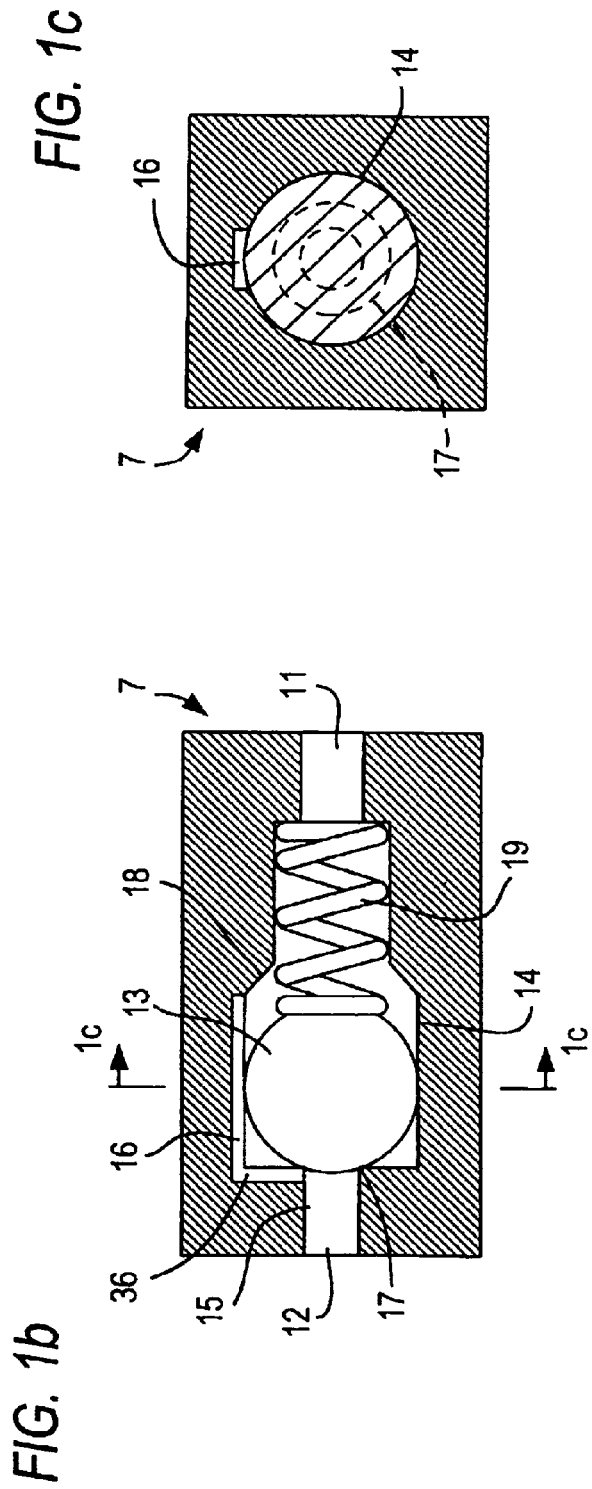

The defined leak of non-return valve 7 in its first, unactuated position is determined by the cross section of groove 36, 16 (FIG. 1c). A leak nominal width, such as, for example, 0.3 mm can be established.

In designing the individual valves, the leak nominal width is preferably matched to the nominal widths of the other valves, especially that of the pressurizing valve. Preferably, the leak nominal width is small compared to the nominal width of the pressurizing valve (in the case of two pressurizing valves, the nominal width of the pressurizing valve having larger cross section is the determining factor for the leak, since a larger sealing seat also exhibits larger leaks). When the pressurizing valve is opened, a backpressure that presses sealing ball 13 against the force of spring 19 onto second sealing seat 18, thus closing it, builds up promptly at inlet 12 of non-return valve 7.

For comparison with inventive non-return valve 7, the construction of a conventional non-return valve is now described. A conventional non-return valve is used to shut off the air stream in one flow direction and to allow it to pass in the other flow direction. In a conventional ball type non-return valve, the sealing ball is pressed via a spring against a sealing seat at the inlet. In the case of air flow directed from the inlet outward, this sealing seat is opened because air flowing in this direction lifts the sealing ball from the valve seat. On the other hand, the sealing seat remains closed in the case of air flow directed toward the inlet.

In comparison with the conventional non-return valve, the non-return valve 7 according to the present invention exhibits a very different functional principle. At very low backpressures at inlet 12, the valve is opened with very small nominal width, to allow a small air stream to pass through. Even at a "normal" small backpressure, however, second sealing seat 18 is promptly occupied, and so the valve is closed. Spring 19 is therefore preferably designed with a relatively compliant spring rate, in such a way that the second sealing seat position is already occupied at a sufficiently low backpressure desired for this purpose, such as, for example, 0.2 bar. On the other hand, it should be appreciated that the ability of a non-return valve of conventional construction to shut off an air stream directed toward the inlet has no bearing for inventive non-return valve 7.

It should be understood that, besides application in a spring-loaded control cylinder designed as an actuating cylinder for a motor vehicle clutch, the valve arrangement depicted in FIG. 1 is suitable for all applications in which a gradual pressure buildup in the piston chamber of the spring-loaded control cylinder as a result of valve leaks can lead to undesired actuation of the control cylinder.

Considering the connections illustrated in FIG. 1, since inlet 12 of non-return valve 7 is in pneumatic communication with a compressed air port 21 of control cylinder piston chamber 9, with second port 3 of pressurizing valve 1 and with second port 6 of venting valve 4, it should be understood that non-return valve 7 can also be installed at a position other than that shown in FIG. 1a, in which case it would not be designed as a separate valve unit, as is the case in FIG. 1a. For example, non-return valve 7 can also be disposed in spring-loaded control cylinder 8, which is advantageous because separate installation of a non-return valve is obviated and also because separate connecting lines are not required.

Figure 2:
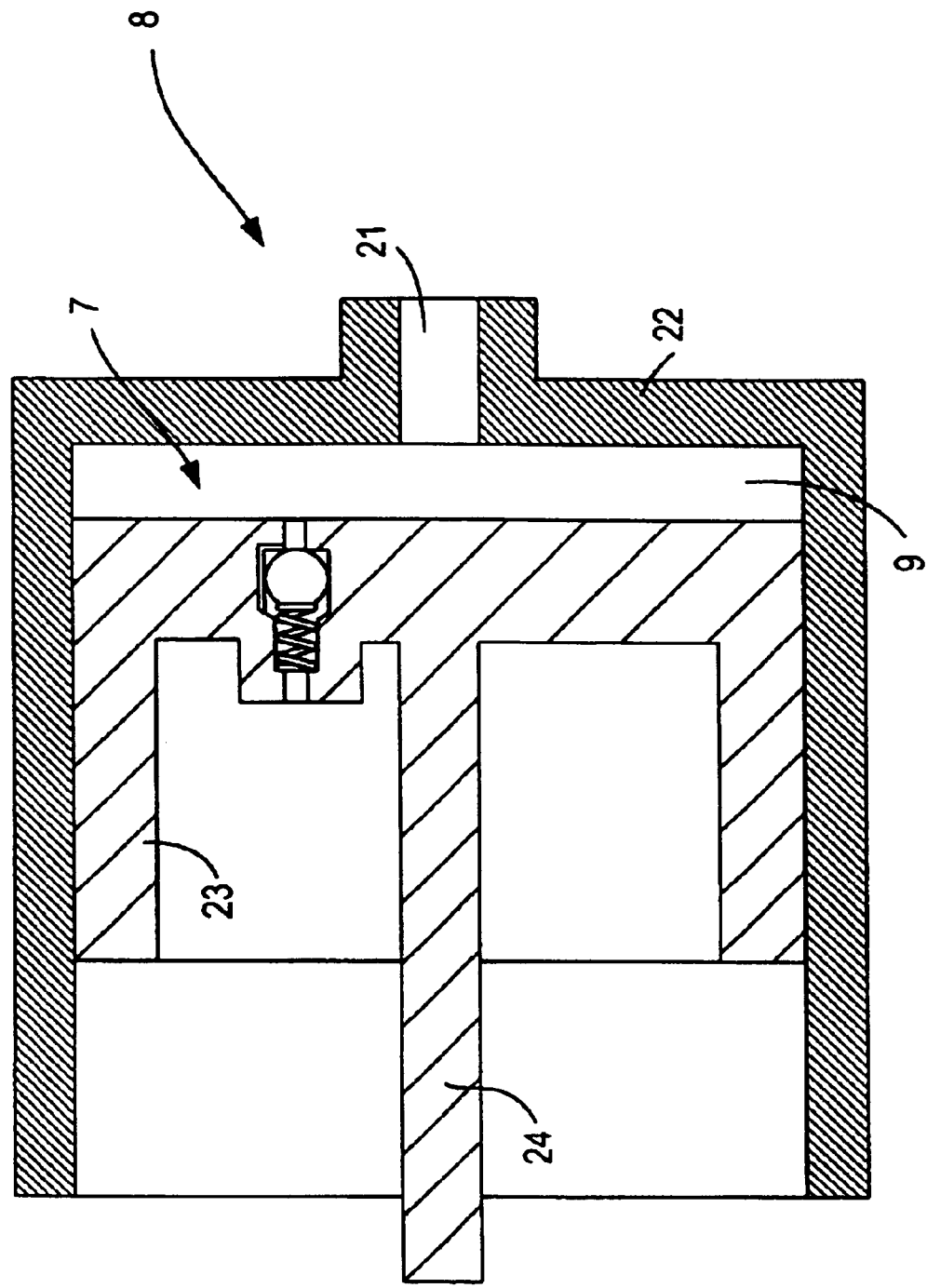
FIG. 2 is a sectional view depicting the valve device according to a preferred embodiment of the present invention disposed in the piston of a spring-loaded control cylinder.

Referring to FIG. 2, non-return valve 7 is shown installed inside a piston 23 of spring-loaded control cylinder 8. A piston rod 24 is also depicted. The cylinder return spring is not shown; it is disposed in the inside chamber of piston 23.

It is possible to dispense with a return spring in control cylinder 8, namely in applications in which a return spring is installed in the very device that is actuated by control cylinder 8 (for example, this is the case in certain embodiments of vehicle clutches described above). Moreover, in contrast to the embodiment of a single-acting control cylinder 8, a control cylinder can also be provided as a double-acting control cylinder, in which a further piston chamber for retraction of piston rod 24 is provided in addition to piston chamber 9 for extension of piston rod 24. Valves for raising and lowering the pressure are also provided for this further piston chamber.

Figure 3:
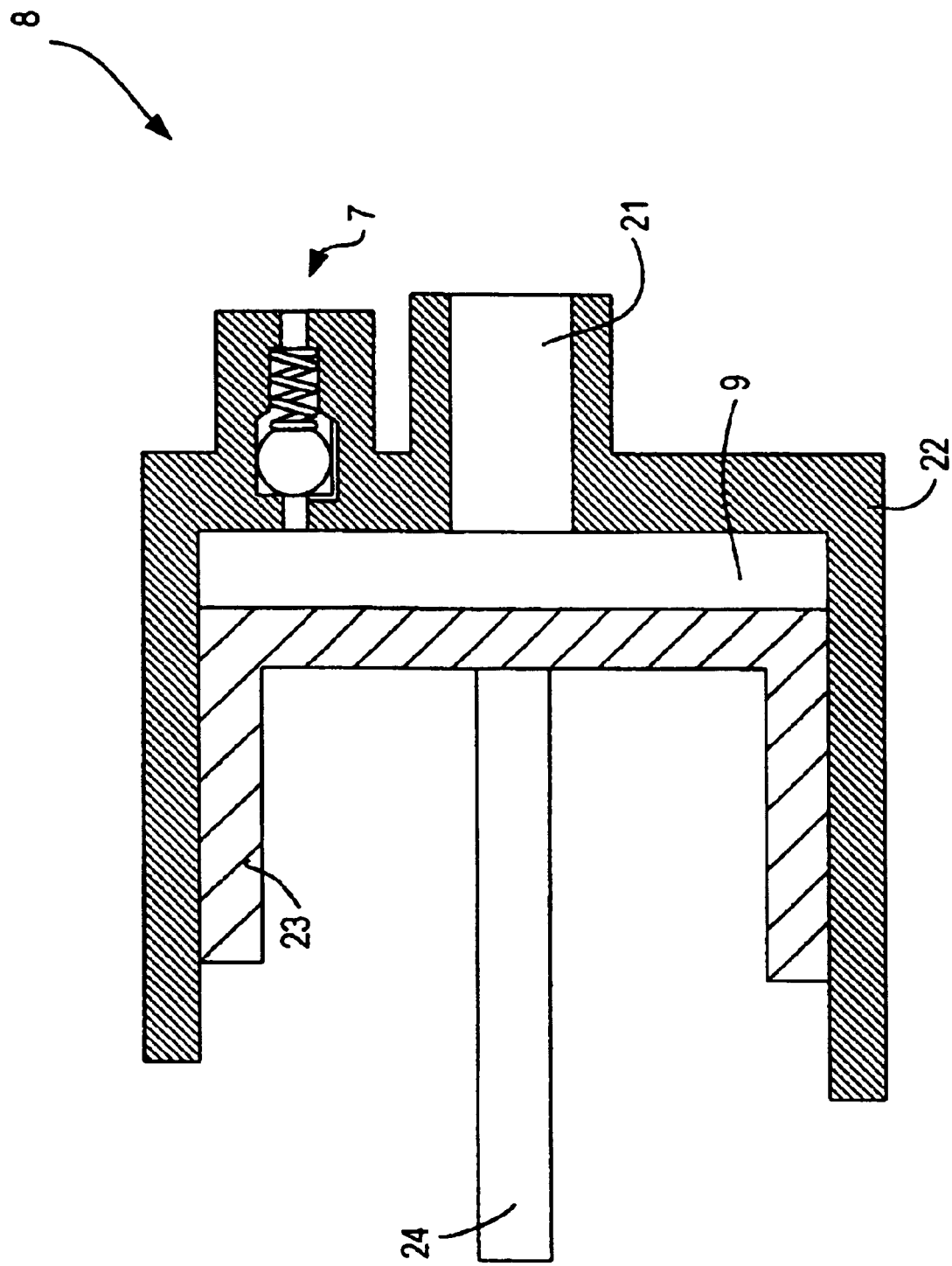
FIG. 3 is a sectional view depicting the valve device according to a preferred embodiment of the present invention alternatively disposed in the housing of a spring-loaded control cylinder.

Referring now to FIG. 3, as an alternative to the arrangement depicted in FIG. 2, non-return valve 7 can also be installed in a housing 22 of spring-loaded control cylinder 8, specifically, in the end wall thereof.

Figure 4:
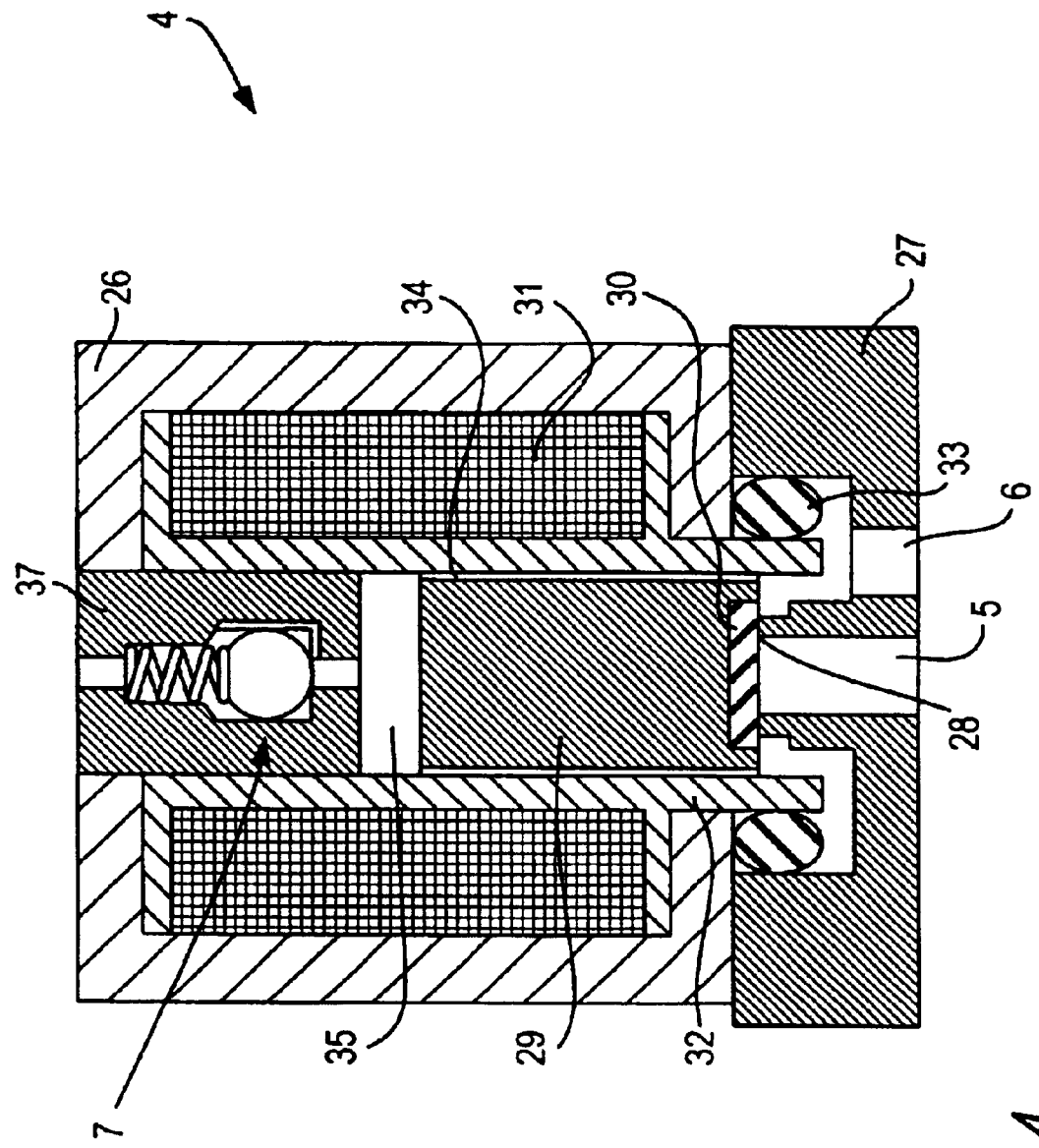
FIG. 4 is a sectional view depicting the valve device according to a preferred embodiment of the present invention alternatively disposed in the venting valve of a spring-loaded control cylinder.

Non-return valve 7 can also be disposed in at least one of the two solenoid-actuated multi-way valves 1 or 4; this is depicted in FIG. 4 for the example of venting valve 4. Indeed, instead of one non-return valve 7, two non-return valves can be mounted in an arrangement of connections as depicted in FIG. 1.

Referring now to FIG. 4, venting valve 4 preferably includes a first housing part 26 and a second housing part 27 joined to the first housing part. An armature guide tube 32 together with a magnet coil 31 is preferably disposed in first housing part 26, and an O-ring seal 33 ensures that second port 6 of the venting valve, in pneumatic communication with control cylinder port 21, is also sealed relative to armature guide tube 32 and, thus, relative to first housing part 26.

A magnet armature 29 is preferably mounted displaceably inside armature guide tube 32. While magnet coil 31 is not energized, the armature is pushed toward second housing part 27 by a spring (not shown) disposed in a valve pressure volume 35, as explained in greater detail hereinafter, in such a way that a magnet armature sealing element 30 bears compliantly on a sealing seat 28 of the second housing part, thus closing the sealing seat when the magnet is not actuated (in pressurizing valve 1 of similar design, a slight leakage in the air stream to control cylinder piston chamber 9 can develop due to leaks from supply 10 via the sealing seat).

When magnet coil 31 is energized, magnet armature 29 is lifted toward a stationary core 37, magnet armature sealing element 30 lifts up from sealing seat 28, and pneumatic communication is established between first port 5 of venting valve 4 in communication with vent 11 and control cylinder piston chamber 9, thus permitting venting of the piston chamber. Preferably, non-return valve 7 is disposed in stationary core 37 such that valve pressure volume 35 is formed between the valve and magnet armature 29.

Valve pressure volume 35 is in communication with second port 6 of venting valve 4 via a pressure channel 34 in magnet armature 29. Valve pressure volume 35 is therefore always in pneumatic communication with control cylinder piston chamber 9, regardless of the switched position of venting valve 4. Venting of valve pressure volume 35 is therefore synonymous with venting of control cylinder piston chamber 9 itself.

As indicated above, the design of pressurizing valve 1 is desirably similar to that of venting valve 4, with the difference that first port 2 is in communication not with vent 11 but with supply pressure 10. Just as for venting valve 4, however, second port 3 is in communication with control cylinder piston chamber 9, and so non-return valve 7 for venting control cylinder piston chamber 9 can also be disposed above valve pressure volume 35 of pressurizing valve 1.

In the embodiment of non-return valve 7 according to FIGS. 1b and 1c, sealing ball 13 at first sealing seat 17 forms a circumferential sealing edge which forms an airtight sealing edge. As explained above, the defined leak is achieved by the cross section of radial portion 36 of the groove in the circumferential sealing edge.

Figure 5A:
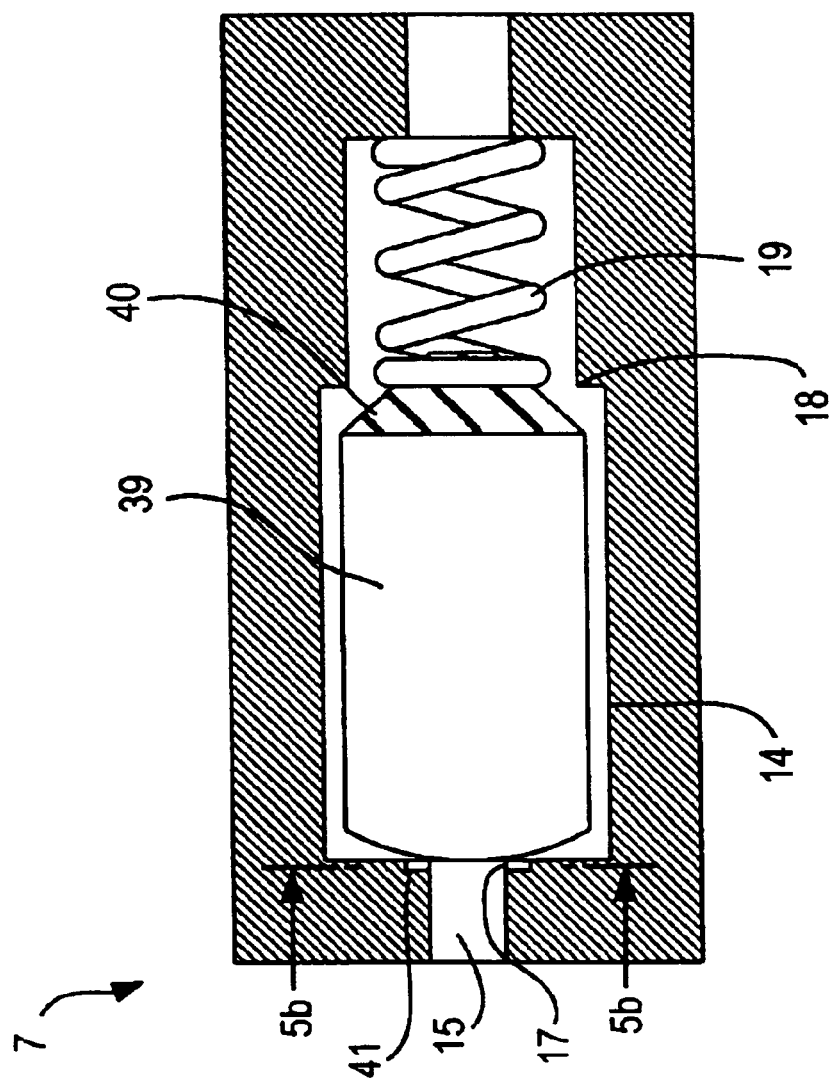
FIG. 5a is an enlarged sectional view depicting a valve device in accordance with an alternative embodiment of the present invention.
Figure 5B:
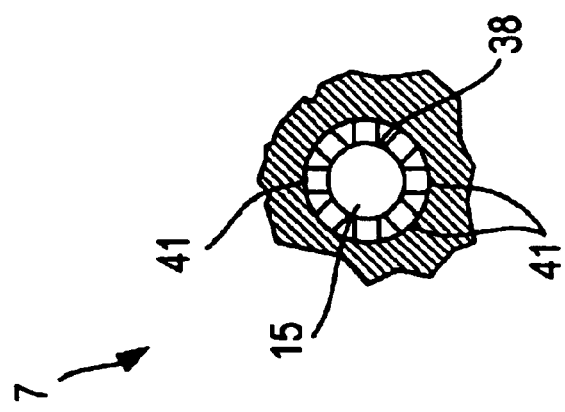

As shown in FIGS. 5a and 5b, the defined leak can also be established by a leak built into the structure of a circumferential sealing edge 38 of first valve seat 17. Notches 41 are provided in the valve housing around the circumference at first valve seat 17 in order to establish the defined leak (for example, eight notches 41 are provided in the preferred embodiment depicted).

Non-return valve 7 according to FIG. 5a and 5b also exhibits further differences in configuration compared with non-return valve 7 according to FIGS. 1b and 1c. For example, instead of a ball there is provided a rotationally symmetric sealing member 39, which is mounted in cylindrical guide 14 with a certain play (exaggerated in FIG. 5a), which ensures the leakage function of longitudinal portion 16 of the groove depicted in FIGS. 1b and 1c.

Furthermore, second sealing seat 18 is desirably formed not as a seat sealing by metal-to-metal contact but as an elastomeric sealing seat. For this purpose, an elastomeric sealing cone 40 can be provided on sealing member 39. This embodiment is particularly advantageous because of its airtight and "compliant" sealing effect. It should be understood that the sealing member can also have a different shape, such as a rotationally symmetric shape (e.g., like a torpedo or an egg).

Accordingly, a valve device is provided which is constructed and arranged to prevent undesired extension of the control cylinder piston rod caused by slight leaks in the pressurizing valve, and which does not require additional programming to accomplish this function. The valve device according to the present invention can be readily integrated as a component in devices that are present in any case, such that additional assembly and connecting-line costs can be avoided.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A valve device for pressurizing or venting the piston chamber of a control cylinder, comprising at least one solenoid-actuated multi-way pressurizing valve, said at least one pressurizing valve having a first port in communication with a supply pressure and a second port in communication with a piston chamber of a control cylinder, at least one solenoid-actuated multi-way venting valve, said at least one venting valve having a first port in communication with a vent and a second port in communication with said control cylinder piston chamber, both said at least one pressurizing valve and said at least one venting valve being in closed position when deenergized, at least one non-return valve, said at least one non-return valve having a pneumatic inlet in communication with said control cylinder piston chamber, said at least one non-return valve constructed and arranged to (i) assume an unactuated position when said pneumatic inlet is depressurized, and an actuated position when said pneumatic inlet is pressurized, and (ii) permit a defined pressure leak in said unactuated position.

2. The valve device according to claim 1, wherein said pressure leak is established by an opening defined in said at least one non-return valve in communication with a vent of said at least one non-return valve, said opening having a nominal width which corresponds to a preselected portion of the nominal width of said at least one pressurizing valve.

3. The valve device according to claim 1, wherein said at least one non-return valve includes a sealing member loaded by the force of a resilient member and mounted in a cylindrical guide, said sealing member being pressed via the force of said resilient member against a first sealing seat at said pneumatic inlet of said at least one non-return valve when said at least one non-return valve is in said unactuated position, said sealing member being pressed sealingly against a second sealing seat at a vent of said at least one non-return valve via pressure force present at said pneumatic inlet of said at least one non-return valve when said at least one non-return valve is in said actuated position, and said first sealing seat being constructed and arranged to establish said defined leak.

4. The valve device according to claim 1, wherein said at least one non-return valve is disposed in said control cylinder.

5. The valve device according to claim 1, wherein said at least one non-return valve is disposed in a housing of said control cylinder.

6. The valve device according to claim 5, wherein said at least one non-return valve is disposed in an end wall of said housing.

7. The valve device according to claim 1, wherein said at least one pressurizing valve includes at least 2/2 ways.

8. The valve device according to claim 1, wherein said at least one venting valve includes at least 2/2 ways.

9. The valve device according to claim 1, wherein said control cylinder is constructed and arranged to control the clutch of a motor vehicle.

10. A valve device for pressurizing or venting the piston chamber of a control cylinder, comprising at least one solenoid-actuated multi-way pressurizing valve, said at least one pressurizing valve having a first port in communication with a supply pressure and a second port in communication with a piston chamber of a control cylinder, at least one solenoid-actuated multi-way venting valve, said at least one venting valve having a first port in communication with a vent and a second port in communication with said control cylinder piston chamber, both said at least one pressurizing valve and said at least one venting valve being in closed position when deenergized, and at least one non-return valve, said at least one non-return valve having a pneumatic inlet in communication with said control cylinder piston chamber, said at least one non-return valve being disposed in a piston of said control cylinder.

11. A valve device for pressurizing or venting the piston chamber of a control cylinder, comprising at least one solenoid-actuated multi-way pressurizing valve, said at least one pressurizing valve having a first port in communication with a supply pressure and a second port in communication with a piston chamber of a control cylinder, at least one solenoid-actuated multi-way venting valve, said at least one venting valve having a first port in communication with a vent and a second port in communication with said control cylinder piston chamber, both said at least one pressurizing valve and said at least one venting valve being in closed position when deenergized, and at least one non-return valve, said at least one non-return valve having a pneumatic inlet in communication with said control cylinder piston chamber, said at least one non-return valve being disposed in at least one of said at least one pressurizing valve and said at least one venting valve.

12. A non-return valve comprising a housing having an inlet in communication with a control cylinder and an outlet, a first sealing seat proximate said inlet, a second sealing seat proximate said outlet, a resilient sealing member disposed in said housing, said sealing member sealingly engaging said first sealing seat when said inlet is below a preselected backpressure, said sealing member sealingly engaging said second sealing seat when said inlet is one of equal to and greater than said preselected backpressure, and a groove having a preselected cross-sectional width formed in said housing, said groove defining an opening to said outlet when said inlet is depressurized to permit passage of a defined amount of air through said opening and said outlet, said defined amount of air having an associative relationship to said preselected cross-sectional width of said groove.

13. The non-return valve according to claim 12, wherein said resilient sealing member is a spring-loaded ball.

14. The non-return valve according to claim 12, wherein said resilient sealing member is a spring-loaded rotationally symmetric member having a frustoconical elastomeric end for engaging said second sealing seat.

15. A non-return valve comprising a housing having an inlet in communication with a control cylinder and an outlet, a first sealing seat proximate said inlet, a second sealing seat proximate said outlet, and a resilient sealing member disposed in said housing, said sealing member sealingly engaging said first sealing seat when said inlet is below a preselected backpressure, said sealing member sealingly engaging said second sealing seat when said inlet is one of equal to and greater than said preselected backpressure, said first sealing seat including at least one notched portion defining an air passage to said outlet when said inlet is depressurized to permit venting of a defined amount of air through said outlet.

16. The non-return valve according to claim 15, wherein said resilient sealing member is a spring-loaded ball.

17. The non-return valve according to claim 15, wherein said resilient sealing member is a spring-loaded rotationally symmetric member having a frustoconical elastomeric end for engaging said second sealing seat.

* * * * *